United States Patent [19]

Nakayama et al.

[11] Patent Number: 5,128,581

[45] Date of Patent: Jul. 7, 1992

[54] PIEZOELECTRIC ACCELERATION SENSOR AND PIEZOELECTRIC ACCELERATION SENSOR DEVICE

[75] Inventors: Shiro Nakayama, Yachiyo; Satoshi Kunimura, Sakura; Katsuhiko Takahashi; Takayuki Imai, both of Tokyo, all of Japan

[73] Assignee: Fujikura Ltd., Tokyo, Japan

[21] Appl. No.: 517,092

[22] Filed: May 1, 1990

[30] Foreign Application Priority Data

| May 2, 1989 | [JP] | Japan | 1-113255 |
| Jun. 16, 1989 | [JP] | Japan | 1-153617 |
| Oct. 20, 1989 | [JP] | Japan | 1-273111 |
| Dec. 7, 1989 | [JP] | Japan | 1-318277 |
| Mar. 9, 1990 | [JP] | Japan | 2-58353 |

[51] Int. Cl.⁵ .............................. H01L 41/08
[52] U.S. Cl. .................. 310/329; 310/800; 73/35; 73/517 R
[58] Field of Search ............ 310/329, 800; 73/35, 73/517 R, 35 R, 35 KR, 35 K, 35 KS, 35 I, 35 M, 35 O, 35 P

[56] References Cited

U.S. PATENT DOCUMENTS

| 2,714,672 | 8/1955 | Wright | 73/517 R |
| 3,349,629 | 9/1964 | Elazar | 310/329 |
| 3,453,457 | 7/1969 | Hayer | 310/329 |
| 3,569,749 | 3/1971 | Zeiringer | 310/329 |
| 3,614,487 | 10/1971 | Hatschek | 310/329 |
| 3,735,161 | 5/1973 | Perkins et al. | 310/329 |
| 3,798,473 | 11/1973 | Murayama et al. | 310/800 |
| 3,911,388 | 10/1975 | Crump et al. | 310/329 |
| 4,332,157 | 6/1982 | Zemel et al. | 310/306 |
| 4,512,431 | 4/1985 | Bloomfield | 310/800 |
| 4,816,713 | 3/1989 | Change | 310/329 |
| 4,924,131 | 5/1990 | Nakayama et al. | 310/329 |

FOREIGN PATENT DOCUMENTS

| 3664389 | 4/1990 | Australia . | |
| 0230198 | 7/1987 | European Pat. Off. | 73/517 R |
| 0316498 | 5/1989 | European Pat. Off. | 73/517 R |
| 1902849 | 1/1968 | Fed. Rep. of Germany | 310/800 |
| 0302169 | 12/1989 | Japan | 73/517 R |
| 0080966 | 3/1990 | Japan | 73/517 R |
| 0447679 | 3/1968 | Switzerland | 73/517 R |
| 0668406 | 3/1952 | United Kingdom | 73/517 R |
| 2225433 | 5/1990 | United Kingdom | 73/517 R |

Primary Examiner—Mark O. Budd
Assistant Examiner—Thomas M. Dougherty
Attorney, Agent, or Firm—Sprung, Horn, Kramer & Woods

[57] ABSTRACT

The invention relates to a piezoelectric acceleration sensor and to a piezoelectric acceleration device which use a film piezoelectric element.

Speifically, the piezoelectric acceleration sensor and the piezoelectric acceleration sensor device generate relatively large outputs when acceleration occurs along the sensing axis, but produce relatively small outputs from acceleration perpendicular to the sensing axis. In addition, the sensor and the sensor device are relatively unaffected by temperature fluctuations and are highly impact-resistant.

8 Claims, 12 Drawing Sheets

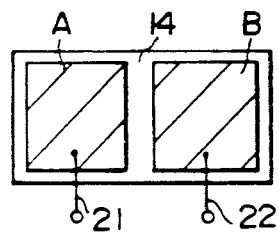
FIG.24(a)
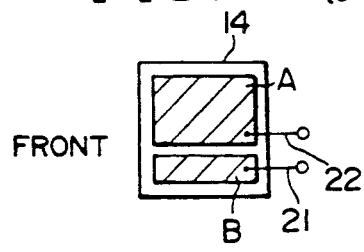
FIG.25(a)
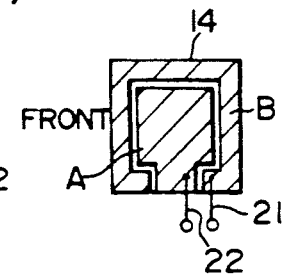
FIG.26(a)
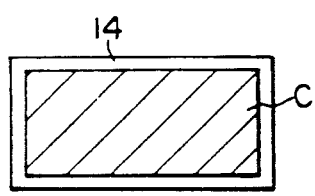
FIG.24(b)
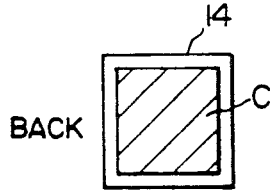
FIG.25(b)
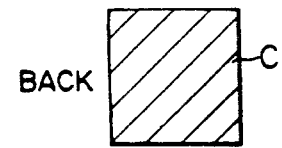
FIG.26(b)
FIG.27(a)
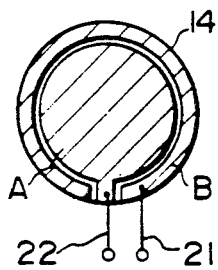
FIG.28(a)
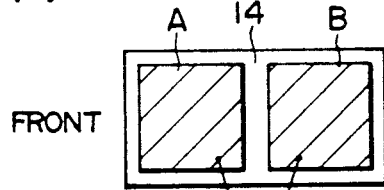
FIG.29(a)
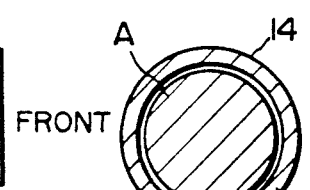
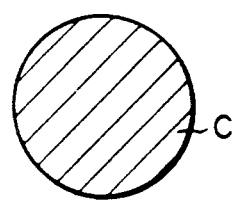
FIG.27(b)
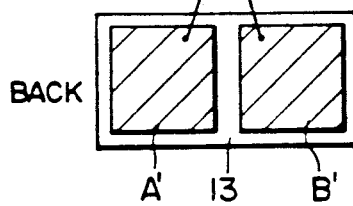
FIG.28(b)
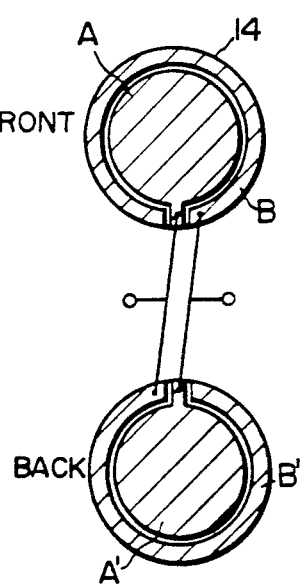
FIG.29(b)

PIEZOELECTRIC ACCELERATION SENSOR AND PIEZOELECTRIC ACCELERATION SENSOR DEVICE

BACKGROUND OF THE INVENTION

1. Application Field of the Invention

This invention generally pertains to a piezoelectric acceleration sensor and a piezoelectric acceleration sensor device which use a film piezoelectric element. Specifically, the piezoelectric acceleration sensor and sensor device employ a simplified structure, which generates a small output by an acceleration perpendicular to the sensing axis, and offers excellent temperature characteristics and high impact resistance.

2. Prior Art

A conventional piezoelectric acceleration sensor (hereinafter referred to as "the sensor") in the public domain is presented in Published Japanese Patent Application 56-10258. This sensor has a disc-shaped diaphragm made of a piezoelectric material (such as piezoelectric polymer) which is fixed on a ring-shaped frame at its circumference. Both sides of the center of the diaphragm have loading elements which function as an inertial mass respectively. The frame is fixed on a pedestal with the diaphragm suspended.

In the sensor, an axis crosses perpendicularly to the film face of the diaphragm and runs through the center of the loading element, which forms the acceleration sensing axis. Such a sensor can detect an acceleration change in the sensing axis direction when a material to be measured is placed on the pedestal.

However, this sensor presents a problem: the loading element produces a directional displacement even when an acceleration is given in the direction perpendicular to the sensing axis. This causes distortion in the diaphragm to generate an electric output.

The sensor also has other drawbacks: its structure is complex and its manufacture is difficult. Also, its measurable frequency band is narrow and difficult to change.

A conventional piezoelectric acceleration sensor device (hereinafter referred to as the sensor device) is known publicly, which accommodates the sensor described in the above Published Japanese Patent Application 56-10258. This sensor device is basically a circuit substrate mounted with two components: an impedance conversion circuit which converts an output from the sensor, and an amplification circuit which amplifies the output. These are arranged side by side in a enclosure. However, this sensor's inevitably large size is undesirable.

SUMMARY OF THE INVENTION

In light of the above, the present invention is intended to provide a piezoelectric acceleration sensor that produces a relatively small output generated from an acceleration in a direction other than the sensing axis. This sensor must be easy to manufacture and be little influenced by ambient temperature, and has good frequency characteristics and impact resistance. It must also be compact.

This piezoelectric acceleration sensor (of the present invention) contains the following: a pedestal installed rigidly on a body to be measured, a detecting element fixed on the measuring plane perpendicular to a sensing axis of this pedestal, and a loading element fixed on this detecting element and made of a rigid material which acts as an inertial mass.

This detecting element comprises a film piezoelectric element, which is in a point symmetry with the sensing axis as the center of the symmetry in a plane with the film plane parallel to the said measuring plane. Metallic electrodes are respectively bonded to both sides of the film piezoelectric element, and at least one of these electrodes is bonded to the film piezoelectric element by a dielectric adhesive.

The loading element is in a point symmetry with the sensing axis as the center of the symmetry in a plane contacting the detecting element. When its cross section is cut with innumerable planes passing through the sensing axis and perpendicular to the said measuring plane, it is in a line symmetry with the sensing axis as the symmetrical axis. This structure reduces the output generated by an acceleration in a direction other than the sensing axis. It also elevates the lamination strength of each laminated layer, and increases impact resistance.

This newly-invented sensor contains the following: a pedestal rigidly installed on a material to be measured; a sensing part fixed on a measuring plane perpendicular to the sensing axis of the pedestal; and a loading element fixed on the said sensing part, which is made up of a rigid material acting as an inertial mass.

The said sensing part includes the film piezoelectric element and two supporting plates made of a rigid material in the form of a plate fixed on both sides of the film piezoelectric element.

The heat conductivity of the material maintains the supporting plates at less than $0.5 \text{ Wm}^{-1}\text{K}^{-1}$. The plane of the film piezoelectric element is in a point symmetry with the sensing axis as the center of the symmetry in the film plane parallel to the said measuring plane.

The loading element is in a point symmetry with the sensing axis as the center of the symmetry in the plane contacting the sensing part. When its cross section is cut with innumerable planes passing through the sensing axis and perpendicular to the said measuring plane, it is in a line symmetry with the sensing axis as the symmetrical axis. This structure can reduce an output which has been generated undesirably from a pyroelectric effect (caused by temperature variations).

Another embodiment of the piezoelectric acceleration sensor for measuring acceleration of an object along a predetermined axis of measurement comprises a base member, a measurement unit, and a weight. The base member is attached to the object. The measurement unit, extending in a plane perpendicular to the predetermined axis of measurement, is supported by the base member, and comprises a piezoelectric membrane, and a pair of electric terminal plates arranged to both surfaces of the piezoelectric membrane. At least one of said electric terminal plates is composed of a plurality of sections separated from one another. The weight is attached to at least one of said sections, the weight means having cross-sections, in any plane perpendicular to the predetermined axis, symmetric with respect to a point whereat the axis crosses the cross-section, wherein the terminal plates to which the weight means are attached are electrically connected with the terminal plates to which the weight means are not attached. The sensor of this structure also reduces the output variations caused by a pyroelectric effect.

Moreover, the sensor device contains the following: the pedestal; the sensing part formed by the film piezoelectric element being held between the supporting plates; and a processing circuit which processes the electrical output from the film piezoelectric element into the sensor (this consists of the loading element fixed on this sensing part, and is made up of a rigid material which acts as an inertial mass and is installed on the opposite side of the measuring plane of the said pedestal). The said assembly is accommodated and fixed in a hollow enclosure with the sensor supported in the hollow enclosure only around the pedestal. The pedestal and the enclosure may be of various shapes so long as support is supplied at the periphery. The pedestal and the enclosure are, for example, not limited to a cylindrical nor a circular shape, but may be of other shapes as well.

The film piezoelectric element is in a point symmetry with the sensing axis as the center of the symmetry in a plane with the film plane parallel to the said measuring plane. The loading element is in a point symmetry with the sensing axis as the center of the symmetry in a plane which contacts the film piezoelectric element. When its cross section is cut with innumerable planes passing through the sensing axis and is perpendicular to the said measuring plane, it is in a line symmetry with the sensing axis as the symmetrical axis. The structure of this sensor makes the whole device more compact, and renders the sensor itself less influenced by temperature variations in the external environment.

BRIEF DESCRIPTION OF THE DRAWINGS

FIG. 21 is a side view and FIG. 22 is a perspective view.

FIGS. 24(a)-29(a) and 24(b)-29(b) are views of the electrodes on the front and rear surfaces of the film piezoelectric element in the third embodiment.

DETAILED DESCRIPTION OF THE PREFERRED EMBODIMENTS

The following is a detailed description of the preferred embodiments of the present invention, with reference to the drawings.

Figure 1:
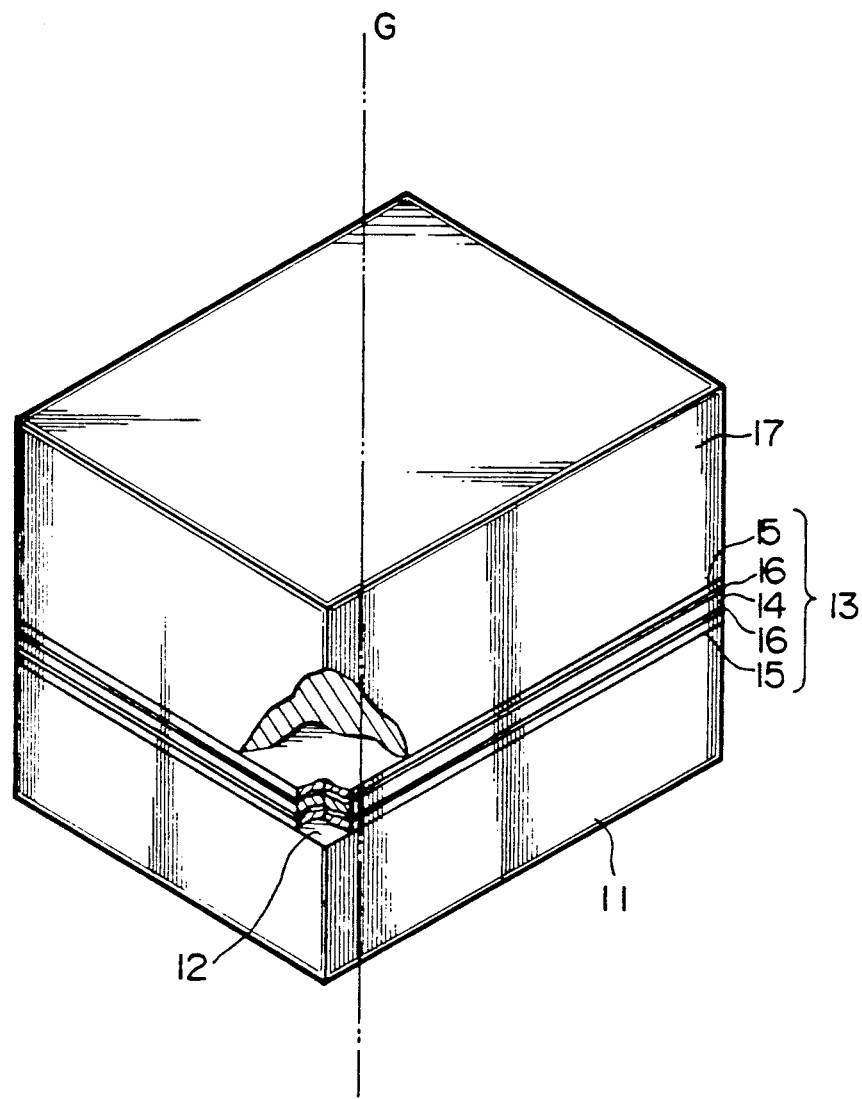
FIG. 1 is a perspective view of an example of the sensor in the first embodiment of the present invention.

FIG. 1 shows the first example of the sensor; the numeral 11 in the figure indicates a pedestal. The pedestal 11 forms the basic body of the sensor, is installed rigidly on the material to be measured, and is made of a suitably rigid material, such as steel, brass or aluminum. The coefficient of elasticity of the material which forms pedestal 11 exceeds that of the film piezoelectric element as explained later, and the thickness of pedestal 11 should preferably be several times that of the film piezoelectric element.

Pedestal 11 shown in the figure is of rectangular parallelepiped shape, but is not limited to this shape; it may, for example, be disc- or column-shaped, and may be of other shapes as well.

Pedestal 11 has one flat and smooth surface as a measuring plane 12. Measuring plane 12 must be precisely perpendicular to the sensing axis G of the acceleration sensor.

On measuring plane 12 of pedestal 11, a detecting element 13 is fixed integrally and securely to the pedestal 11. To fix pedestal 11 and detecting element 13, a hardening-type adhesive such as an epoxy adhesive is used; this adhesive (not shown in the figure) forms a bonded layer between pedestal 11 and detecting element 13.

Detecting element 13 contains a film piezoelectric element 14 and metallic foil electrodes 15, the latter being arranged on both sides of element 14, the metallic electrodes 15 and 15 being bonded to the film piezoelectric element 14 respectively by dielectric bonded layers 16 and 16 made of a dielectric adhesive.

The film piezoelectric element 14 uses a piezoelectric material with a thickness of 10 to 500 microns, the thickness being sufficiently uniform and the quality being sufficiently homogenous. The piezoelectric material typically includes the following: polyvinylidenefluoride (PVDF), polyvinylidenechloride, polyvinylfluoride, polyvinylchloride, nylon including nylon 11 and polymetaphenyleneisophthalamide, copolymers of tetrafluoroethylene, trifluoroethylene, vinyl fluoride with vinylidene fluoride, copolymers of vinyl acetate and vinyl propionate. It also includes vinyl benzoate with vinylidene cyanide, polymers such as blended polymers of polyvinylidenefluoride with polycarbonate, blended polymers of polyvinylidenefluoride with polyvinylfluoride, as well as piezoelectric powders such as metatitanate and titanate zirconate added and dispersed in a polymer.

Film piezoelectric element 14 may use many films laminated by dielectric adhesive, rather than using a single film, and the thicker the total thickness, the more the output, which is desirable. The film piezoelectric element is made of a fluororesin such as polyvinylidenefluoride and should preferably have its surface activated by a surface treatment using sodium. The treatment increases its adhesion to the metallic electrode 15 and improves impact resistance.

Metallic electrode 15 uses various kinds of metallic sheets, including aluminum and copper foils with a thickness of 10 to 500 microns.

The dielectric adhesive to form the dielectric bonded layer 16 should preferably have a dielectric constant of more than 2.5. It is best to use such adhesives as epoxy, phenol and the cyanoacrylate series.

In the detecting element 13 of the above structure, the metallic electrodes 15, the latter are arranged on both sides of film piezoelectric element 14 with the dielectric bonded layers 16, the latter interposed. Because the dielectric bonded layer 16 is formed by the dielectric adhesive, the detecting element 13 functions as a capacitor, thereby making it possible to remove the output of the film piezoelectric element 14 from across the metallic electrodes 15 and 15.

The planar shape of detecting element 13 and film piezoelectric element 14 is significant in reducing transverse sensitivity.

The transverse sensitivity in the present invention refers to an output $P_1$ when applied with an acceleration in the direction of the sensing axis G of the sensor, and an output $P_2$ when applied with an acceleration in a direction perpendicularly crossing the sensing axis G. This is expressed as the ratio of $P_2/P_1$.

Figure 2:
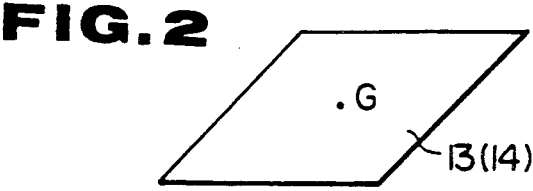
FIGS. 2 through 7 are plan views of examples of the plane shape of the film piezoelectric element.
Figure 3:
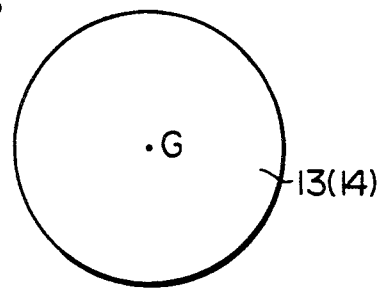
Figure 4:
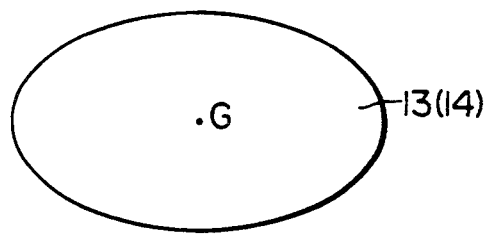
Figure 5:
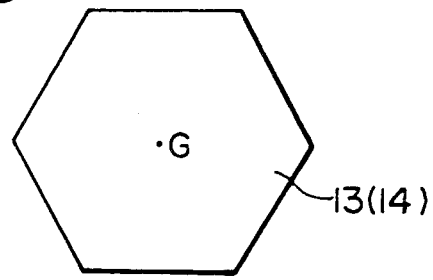
Figure 6:
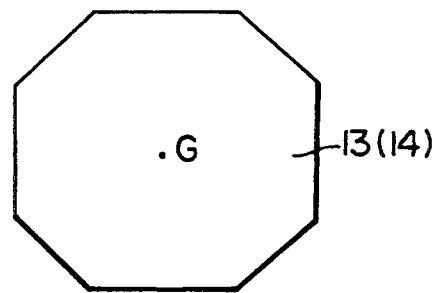
Figure 7:
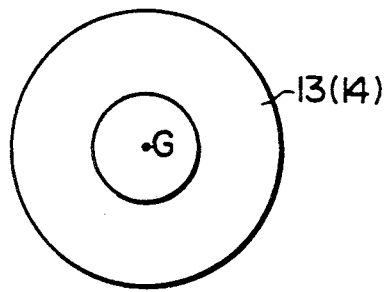

The planar shape of the piezoelectric film 14 must be in a point symmetry with the sensing axis G as the center of the symmetry in a plane parallel to the measuring plane 12. The shape shown in FIG. 1 is that of a rectangular parallelepiped. Other shapes that meet this requirement are shown in FIGS. 2 through 7. FIG. 2 shows a parallelogram, FIG. 3 a circle, FIG. 4 an ellipse, FIG. 5 a regular hexagon, FIG. 6 a regular octagon and FIG. 7 a ring. The symbol G in these figures indicate the sensing axis G. All of these planar shapes are in a point symmetry with the sensing axis G as the symmetrical center. Needless to say, other shapes that satisfy the above requirement can be used.

On the detecting element 13, is integrally fixed a loading element 17 made of a rigid material and acting as an inertial mass. Loading element 17 is displaced when applied with an acceleration, and generates a distortion or a stress in the film piezoelectric element 14. Its weight is not especially limited, because it relates to an electrical output per unit acceleration of the sensor. It should however, be in a range that will not generate a creep in the film piezoelectric element 14. Loading element 17 is fixed to detecting element 13 in a manner similar to pedestal 11 being fixed to detecting element 13.

The three dimensional shape of loading element 17 plays an important role in reducing the transverse sensitivity.

First, the face of loading element 17 which contacts detecting element 13 (hereinafter called the bottom face) needs to be precisely perpendicular to the sensing axis G, and the planar shape of the bottom face must be in a point symmetry with the sensing axis G as the symmetrical center. Therefore, since the planar shape meets this requirement, those shown in FIGS. 2 through 7 can be used, as in the case of detecting element 13 and film piezoelectric element 14. However, in a combination of detecting element 13 and loading element 17, the planar shape of the bottom face of loading element 17 does not have to be the same as that of detecting element 13. For example, the planar shape of detecting element 13 of a regular square may be combined with that of the loading element of a circle, as long as the combination has the same sensing axis G.

Figure 8:
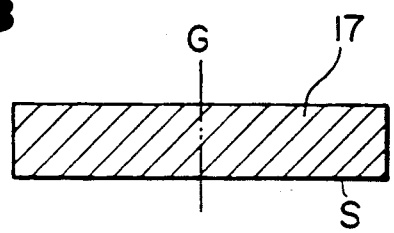
FIGS. 8 through 14 are cross sectional views of examples of the three-dimensional shape of the loading element.
Figure 9:
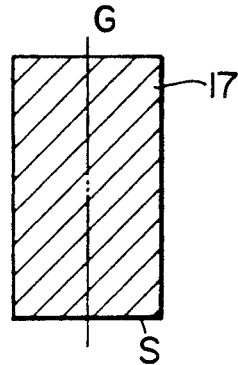
Figure 10:
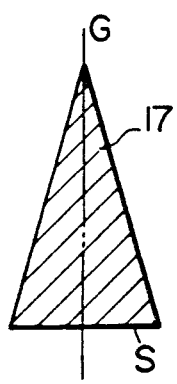
Figure 11:
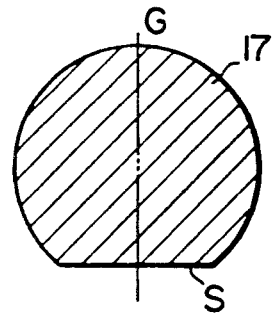
Figure 12:
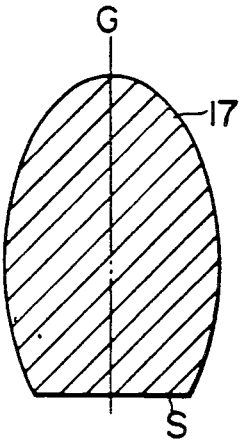
Figure 13:
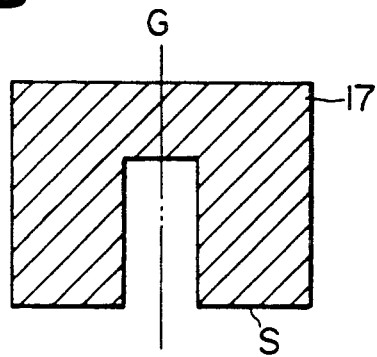
Figure 14:
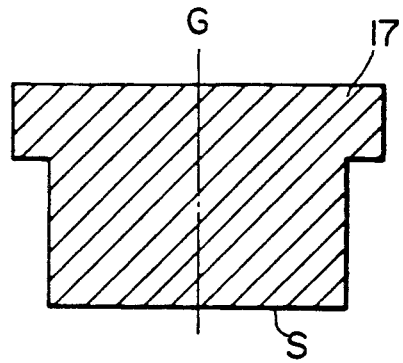

At the same time, when the loading element 17 is crosscut into innumerable planes passing through the sensing axis G and perpendicular to the bottom face, it must be in a line symmetry with the sensing axis G as the symmetrical center, relative to all the cross sections. Those satisfying the line symmetry requirement are shown in FIGS. 8 through 14. FIG. 8 shows a plate, FIG. 9 a column, FIG. 10 a cone, FIG. 11 a sphere cut by a plane, FIG. 12 an ellipse cut by a plane, FIG. 3 a column formed with a hollow section inside, and FIG. 14 a combination of the column and plate. In these figures, the symbol S indicates the bottom face and the symbol G indicates the symmetrical axis coinciding with the sensing axis. Therefore, loading element 17, to satisfy the line symmetry requirement, must have its center of its gravity on the sensing axis G. In addition, the loading element 17, besides being made of the same material, can be made of a composite material consisting of different materials. However, in this case, each material must be able to bind securely with the others to form a material that can be regarded as a wholly rigid material, with each material not causing different displacements when applied with an acceleration.

Furthermore, a loading element with many divided loading elements (having different masses) laminated along the sensing axis G can be used as the loading element 17. The laminates of the divided loading element enable fine adjustment of the sensor output. In the loading element using the laminates, it is preferable to make it satisfy the relation of the following equation to eliminate a noise influence caused by the pyroelectric effect: $0.8\,(K_B t_B) \leq (K_W/t_W) \leq 1.2\,(K_B/t_B)$, where $t_B$ is the thickness of pedestal 11, $K_W$ is the heat conductivity of the divided loading element directly above detecting element 13, and $t_W$ is the thickness of the divided loading element.

Moreover, to produce loading element 17 out of a magnetic material such as iron or an iron alloy, and to dispose a magnetic field generating coil in the vicinity of the sensing axis G of loading element 17, will make it possible to self-diagnose the output calibration and the degradation of the sensor. That is to say, when the magnetic field generating coil is energized, a magnetic attracting or repulsive force acts on loading element 17, and causes an output from film piezoelectric element 14. Since this output is maintained at a certain value because of the magnetic field generating coil, output calibration and degradation can be determined.

For loading element 17 to satisfy this requirement, (that is, to have the symmetrical characteristic), it must be arranged and fixed with its symmetrical axis coinciding with the symmetrical center of detecting element 13. In other words, the symmetrical center of detecting element 13 should coincide with the symmetrical axis of loading element 17.

The sensor of this structure is used with pedestal 11 fixed on the material to be measured, to measure an acceleration in a direction of the sensing axis G.

The sensor of this structure produces very little transverse sensitivity, because the planar shape of detecting element 13 and its film piezoelectric element 14 is in a point symmetry with the sensing axis G as the symmetrical center, and the planar shape of the bottom face of loading element 17 is in a point symmetry with the sensing axis G as the symmetrical center. At the same time, the three dimensional shape of loading element 17 is in a line symmetry with the sensing axis G as the symmetrical axis in all the planes passing through the sensing axis G.

Generally, when an acceleration is applied to the sensor in a direction other than its sensing axis direction, the acceleration is divided according to the vector resolution law into a component of at least two directions perpendicularly crossing the sensing axis and a component of the sensing axis direction. The component which perpendicularly crosses the sensing axis acts on the center of gravity of loading element 17 to cause a bending moment around the gravitational center acting on loading element 17. Therefore, a compressive force acts on part of film piezoelectric element 14 in detecting element 13, and a tensile force on the remaining part. Film piezoelectric element 14 generates electrical charges of opposite signs because of the compressive and tensile forces. If, however, the charges are equivalent in amount, these cancel each other out, which results in no output. Therefore, if compressive an tensile forces of the same amounts are applied to the film piezoelectric element, the latter will not output any output, and the sensor will not detect the acceleration in a direction other than the sensing axis.

In the present invention, because the respective shapes of detecting element 13 (film piezoelectric element 14) and the loading element 13 are given the symmetrical characteristic as described above, film piezoelectric element 14 is applied with the same amounts of compressive and tensile forces, even if the acceleration in a direction other than the sensing axis is given, thereby making film piezoelectric element 14 produce no output, making the transverse sensitivity very small.

In addition, the sensor can have a high upper limit of the measurable frequency, and a wide measurable frequency band. The upper limit of the measurable frequency of this type of the sensor is determined by the resonant frequency of the sensor. Because the resonant frequency of the sensor of the present invention is, structurally, in proportion to the values of elements which exist between pedestal 11 and loading element 17, (that is, the coefficients of elasticity the adhesive layer, the dielectrically bonded layer 16 and film piezoelectric element 14, divided by the mass of loading element 17), the resonant frequency is over two orders of magnitude than that of the conventional diaphragm type sensor, and is on order of kilohertz. However, care should be taken that the resonant frequency decreases as the coefficient of elasticity of the adhesive layer decreases. In this case, the effect of the metallic electrode 15 can be ignored, since it is regarded as a rigid material.

For this reason, the structure which uses an adhesive to fix detecting element 13 with pedestal 11 and loading element 17 must satisfy the relationship presented by the following equation: $(E_A/t_A) / (E_P/t_P) \geq 0.1$, where $E_A$ is the coefficient of elasticity of the adhesive layer and the dielectrically bonded layer 16, $t_A$ is the total thickness of the adhesive layer and the dielectric bonded layer, $E_P$ is the coefficient of elasticity of the film piezoelectric element 14, and $t_P$ is its thickness.

The coefficient of elasticity of the adhesive layer and the dielectrically bonded layer in the above equation is determined by calculating the ratios of the coefficient of elasticitys of the respective bonded layers to the thickness, summed, and substituted into the above equation.

What this equation refers to is a condition that the force generated in loading element 17, as a result of the acceleration, is transmitted to film piezoelectric element 14 without being absorbed and decreased by the adhesive layer and the dielectrically bonded layer. If the value of the above equation equals less than 0.1, the absorption and decrease of the force by the adhesive layer and the dielectric bonded layer can no longer be ignored, or this will result in a decrease of the resonant frequency, and a narrowing of the measurable frequency band as described above.

Therefore, the adhesive used to attach detecting element 13 to pedestal 11 and the detecting element to loading element 17, and the dielectric adhesive, must be selected from a hardening adhesive of high coefficient of elasticity, such as epoxy, phenol or the cyanoacrylate series. Adhesion using rubber series adhesive is inadequate.

Because the sensor of this structure has pedestal 11, detecting element 13 and loading element 17 simply laminated, the structure is simplified. It also facilitates manufacture, and makes the device more compact. Also, because the metallic electrodes 15 and 15 are bonded securely to film piezoelectric element 14 by dielectrically bonded layers 16 and 16, the sensor has sufficient strength against an impact against not only its direction of thickness but also its face direction (a direction perpendicularly crossing the sensing axis G). In addition, disposing such metallic electrodes 15, the latter serves to simplify the wiring to remove electrical signals. It also makes various bonded technologies used in semiconductor manufacturing applicable, and makes connection with various printed cards, for example flexible printed circuit (FPC), possible.

In the example described above, the detecting element 13 is formed by film piezoelectric element 14 and metallic electrodes 15 and 15 disposed on its both sides, and metallic electrodes 15 and 15 are constructed by attaching them to film piezoelectric element 14 using the dielectric bonded layers 16 and 16. However, the structure need not be limited to this construction; metallic electrode 15 can be attached to one face of film piezoelectric element 14 through dielectric bonded layer 16, and another metallic electrode can be disposed directly on the other face using a deposition process.

Embodiment 1

An aluminum sheet with a thickness or 1.0 mm was prepared to form the material of the pedestal. Copper foils having a thickness of 30 microns were bonded onto both sides of the vinylidene fluoride sheet having a thickness of 110 microns(a film piezoelectric element) using an epoxy adhesive (product name: "Araldite" made by Ciba-Geigy), and the sheet was cut to a size so that the bottom face will be a square of 10 mm on a side to be used as a chip. The bonded layers (dielectric bonded layers) have a thickness of about 15 microns in this case, and the coefficient of elasticity of the film piezoelectric element is $2.7 \times 10^9$ Pa.

Next, the bottom face of the chip was bonded to the said aluminum sheet using an epoxy adhesive, and the loading element was bonded on top of the chip using the epoxy adhesive. In bonding the loading element, the film piezoelectric element of the said chip and the loading element were arranged so that their symmetrical axes corresponded with each other. The thickness of each of the bonded layers is about 20 microns. The loading element, made of brass, has a square bottom face with sides of 10 mm, a height of 5 mm, and a mass of 4.2 g. The coefficient of elasticity of the adhesive used is $3.5 \times 10^9$ Pa.

Embodiment 2

Aluminum was directly vacuum deposited on one face of the polyvinilydenefluoride sheet 1 to form an aluminum electrode, and a copper foil 30 microns thick was bonded to the other face using an epoxy adhesive in a similar manner to Embodiment 1, and cut to a square chip with sides of 10 mm.

Next, the bottom face of the chip was bonded to the aluminum sheet that forms the pedestal, using an epoxy adhesive in a manner similar to Embodiment 1, and the same loading element (as the one in Embodiment 1) was bonded on top of the chip in a similar manner.

Embodiment 3

A sensor was fabricated in a manner similar to Embodiment 1, except that a column with a diameter of 14 mm and a weight of 4.2 g was used as a loading element.

Embodiment 4

A sensor was fabricated in a manner similar to Embodiment 3, except that a disc-shaped chip with a diameter of 14 mm was used.

Comparison 1

A sensor described in Embodiment 1 was fabricated with the symmetrical axis of the loading element and the chip intentionally shifted by 1.5 mm.

Comparison 2

A sensor described in Embodiment 2 was fabricated using a chloroprene adhesive to bond the loading element with the chip. The thickness of the bonded layer was about 30 microns, and the coefficient of elasticity was $7 \times 10^6$ Pa.

Comparison 3

An aluminum sheet of the same specification as the one used in Embodiment 1 was prepared for a pedestal. Aluminum was directly deposited on both faces of the fluorovinilydene sheet (the piezoelectric element) (which had a thickness of 110 microns) to form a deposited aluminum electrode, and cut to a square chip with sides of 10 mm.

Next, the bottom face of the chip was bonded to the aluminum sheet that forms the pedestal, using an epoxy adhesive in a manner similar to Embodiment 1, and the same loading element (as the one in Embodiment 1) was bonded on top of the chip in a similar manner.

Comparison 4

As aluminum sheet of the same specification as the one used in Embodiment 1 was prepared for a pedestal. A 110 micron-thick fluorovinilydene sheet (piezoelectric element) was cut to a square with sides of 10 mm; a dielectric paste was coated on both sides of the sheet; and the pedestal and the loading element were bonded over the paste to form a sensor assembly.

The thickness of each dielectric paste layer is 20 microns, and the coefficient of elasticity is $2.0 \times 10^9$ Pa.

Conventional structure 1

The film piezoelectric element used in Embodiment 1 was cut to a 20 mm diameter disc to form a vibration sheet. Hemispheres of polymethylmethacrylate were fixed on both sides of the vibration sheet at its central axis to form an inertial mass, and the circumference of the vibration sheet was bonded to a ring-shaped frame using an epoxy adhesive to form a sensor. The sensor is identical with the one laid open in Japanese Patent Application No. 56-10258.

A film piezoelectric element made of polyfluorovinylidene which has a thickness of 30 microns was bonded to a vibration sheet made of copper which has a thickness of 30 microns, using an epoxy adhesive.

This element was fixed in a ring shaped frame to form a vibration part with a diameter of 15 mm, and a 7 mm diameter hole was drilled in its center to form a sensor.

Conventional structure 3

A film piezoelectric element made of polyfluorovinylidene which has a thickness of 50 microns was bonded to a brass plate which has a thickness of 0.5 mm, using an epoxy adhesive. This element was cut to an oblong shape of 5 mm wide and 35 mm long, and a hole of 2 mm diameter was drilled through its center. The oblong plate was bent to a bow shape with the radius of curvature at 70 mm so that the film piezoelectric element is on its outside. This element was used as a three-point supporting type vibration beam with a screw inserted into the through hole to provide a concavity, and was attached to the pedestal to perform as a sensor.

The following performance evaluation tests were conducted on these sensors of the embodiments, comparisons and conventional structure.

The output of each sensor is outputted as a voltage using an impedance conversion circuit connected to the sensor.

The following items were evaluated in the performance evaluation test according to acceleration detection.

(1) Sensor output V per 1 G in the sensing axis (a value after correcting the gain obtained in the impedance conversion circuit) and the minimum detecting acceleration (s/n=3), where G is the gravitational constant (9.8 m/s$^2$).

(2) Measurable frequency range (a range of $\pm 10\%$ of the output at central frequency).

(3) Crosstalk (the ratio of an output when 1 G acceleration is given to a direction perpendicular to the sensing axis to a 1 G output in the sensing axis, indicated in percent).

In addition, impact resistance was evaluated.

The impact resistance test consisted of destroying the sensor chip by applying an impact acceleration of 5000 G from a direction lateral to the sensor, and the number of impact accelerations given before the sensor chip was destroyed were counted. The results are shown in Table 1.

TABLE 1

| | Conventional structure | | | Embodiment | | | | Comparison | | | |
|---|---|---|---|---|---|---|---|---|---|---|---|
| | 1 | 2 | 3 | 1 | 2 | 3 | 4 | 1 | 2 | 3 | 4 |
| Sensor output (rms) mV/G | 12.7 | 1.4 | 5.7 | 3.5 | 3.6 | 3.5 | 2.7 | 3.4 | 3.6 | 3.5 | 3.5 |
| Minimum detecting acceleration (G) | 0.02 | 0.1 | 0.05 | 0.05 | 0.05 | 0.05 | 0.05 | 0.05 | 0.05 | 0.04 | 0.05 |
| Measurable frequency band (Hz) | 0.01–150 | 1–300 | 1–250 | 1–5K | 1–5K | 1–5K | 1–5K | 1–4.5K | 1–500 | 1–5K | 1–4.5K |
| Crosstalk (%) | 35 | 14 | 23 | 3 | 3 | 3 | 3 | 25 | 4 | 4 | 5 |
| Impact resistance (cycle) | 172 | 168 | 138 | 156 | 65 | 160 | 190 | 145 | 66 | 2 | 3 |

Figure 15:
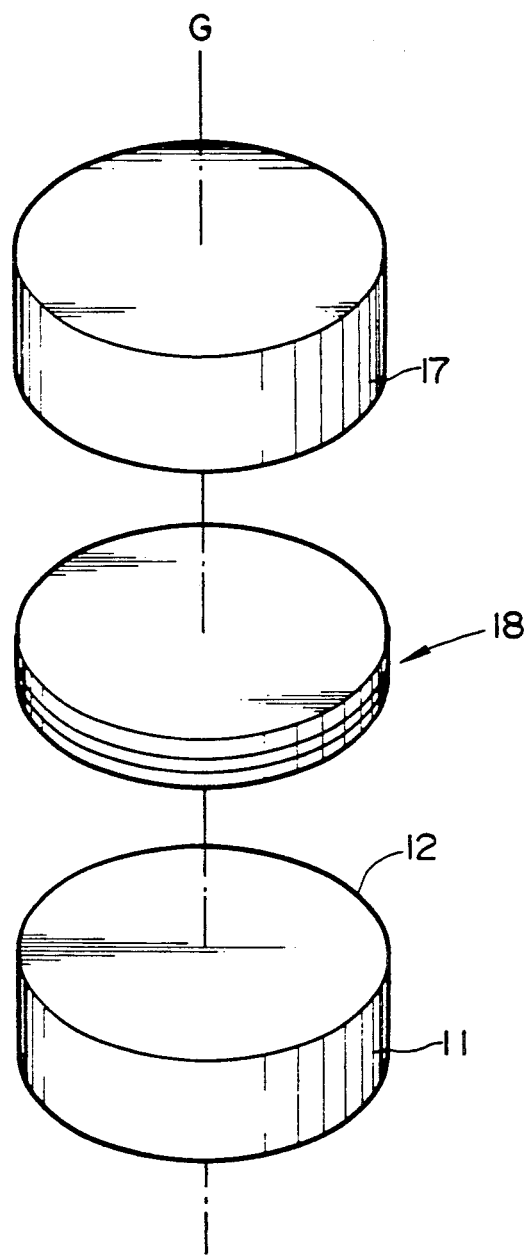
FIG. 15 is an exploded perspective view of an example of the sensor in the second embodiment of the present invention.

FIG. 15 is the second embodiment.

In this sensor, a sensing part 18 is bonded integrally to pedestal 11 on its measuring plane 12 using an epoxy adhesive.

Figure 16:
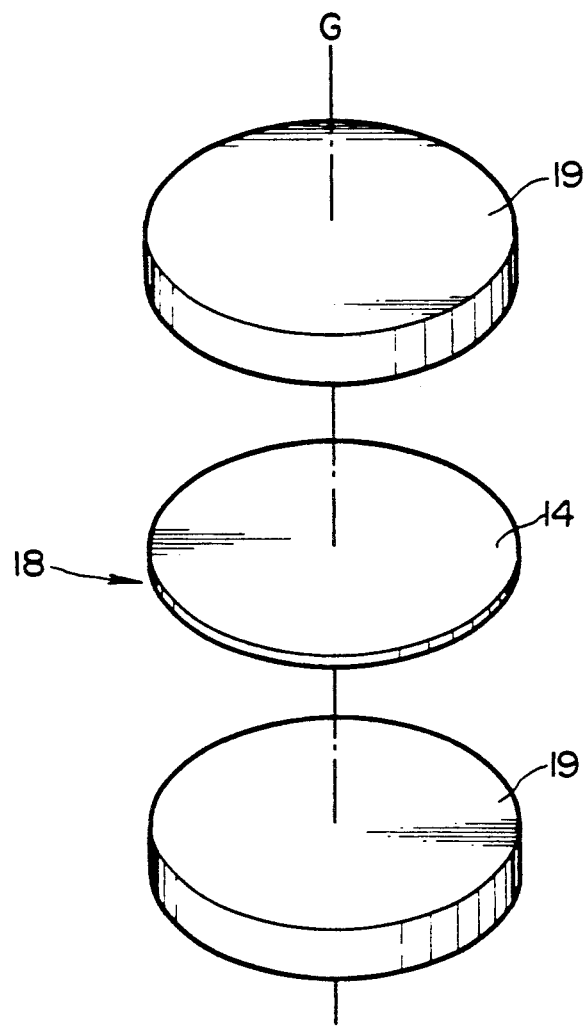
FIG. 16 is an exploded perspective view of an example of the sensing part of the sensor in FIG. 15.

Sensing part 18 consists of disc-shaped supporting plates 19 and 19 bonded on both sides of a disc-shaped film piezoelectric element 14 as shown in FIG. 16. Film piezoelectric element 14, described in the previous example and as shown in FIG. 1 is used in this case, and both its sides are bonded with the same metallic electrodes shown in FIG. 1 to remove an output over a dielectric adhesive forming dielectric layers 16 in FIG. 1. Film piezoelectric element 14 does not have to be a single sheet; a structure laminating more than two sheets using a dielectric adhesive may be adopted.

For the supporting plate 19, a sheet material with sufficient rigidity and heat conductivity of less than 0.5 Wm$^{-1}$ K$^{-1}$ is used. This includes, for example, ceramic sheets, glass sheets, and sheets of fiberglass-reinforced plastic (FRP) such as fiberglass-reinforced epoxy resin and fiberglass-reinforced polyester resin, each having a thickness of 0.5 mm to 2 mm. If the heat conductivity exceeds 0.5 Wm$^{-1}$ K$^{-1}$, film piezoelectric element 14 transmit the external temperature variations to increase output variation caused from the pyroelectric effect. Bonding film piezoelectric element 14 with supporting plate 19 uses an epoxy adhesive. The sensing part thus made becomes a rigid plate as a whole, building the thickness to several millimeters to facilitate handling.

The planar shape of the film piezoelectric element equal symmetry is described in the previous embodiments.

In addition, sensing part 18 has loading element 17 attached to it by an epoxy adhesive. This loading element 17 is identical with the ones shown in the previous embodiments, and so is the symmetry required in the planar shape.

In this sensor, the adhesive used for bonding sensing part 18 itself, and with pedestal 11 and loading element 17 needs t satisfy the relationship expressed by the following equation: $(E_A/t_A) / (E_p/t_p) \geq 0.1$, where $E_A$ is the composite equivalent coefficient of elasticity of the adhesive layer and supporting plate 19, $t_A$ is the sum of the thickness of these elements, $E_p$ is the coefficient of elasticity of the film piezoelectric element 14, and $t_p$ is the thickness.

If the kind of adhesive and the coefficient of elasticity differ, the ratio of the coefficient of elasticity and thickness at each adhesive layer is obtained, and substituted in the equation.

In this sensor, sensing part 18 is a rigid element with a thickness of several millimeters, thereby making handling easy and reducing the labor in manufacturing. In addition, since the heat conductivity of supporting plate 19 is less than 0.5 Wm$^{-1}$ K$^{-1}$, the variation of the atmospheric temperature outside the sensor is sufficiently moderated time-wise, and transmitted to film piezoelectric element 14. Therefore, the output from film piezoelectric element 14 generated from the pyroelectric effect becomes very small, which improves the temperature characteristics of the sensor output.

Figure 17:
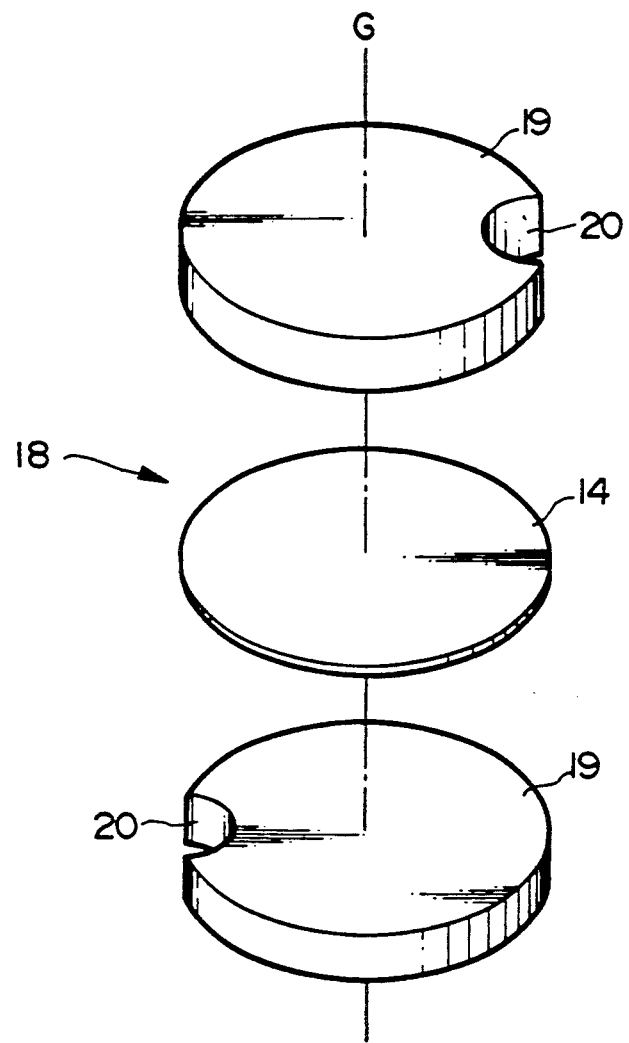
FIG. 17 is an exploded perspective view of another example of the sensing part.

FIG. 17 is another example of sensing part 18. The latter is made up of a disc-shaped film piezoelectric element 14 having on its both sides the supporting plates 19 and 19 formed with a notch 20. Supporting plate 19 used in this structure is also made of a material which has the heat conductivity of less than 0.5 Wm$^{-1}$ K$^{-1}$ with the same disc-shape as film piezoelectric element 14, but has the semicircular notch 20 formed on part of it. Notch 20 should have an area of less than 25% of the area of film piezoelectric element 14. An area exceeding 25% impairs the symmetrical characteristic of element 14 so that it detects an acceleration in a lateral direction, resulting in larger transverse sensitivity, reduced bonding area and bonding strength, as well as decreased impact resistance. Notch 20 should be open to the outside of supporting plate 19. The shape of notch 20 has no limitations, and a square-shaped notch may be used in place of the semicircular notch shown in FIG. 17. The two supporting plates (19 and 19), however, must have notches of an identical shape. In bonding the two supporting plates on both sides of film piezoelectric element 14, supporting plate 19 formed with notch 20 must be arranged so that when one of supporting plates 19 is rotated 180 degree with respect to the sensing axis G as the rotation center, notch 20 will lie completely upon notch 20 of the other supporting plate 19 with an exact correspondence in position. If this condition is not met, sensing part 18 will be unsymmetrical, worsening the sensor cross talk.

Figure 18:
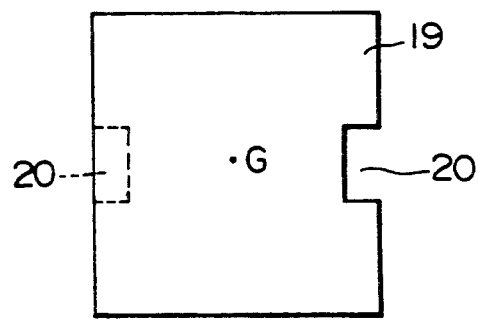
FIGS. 18 through 20 are plan views of an example of the plane shape of supporting plates used ±n the sensor in the second embodiment.
Figure 19:
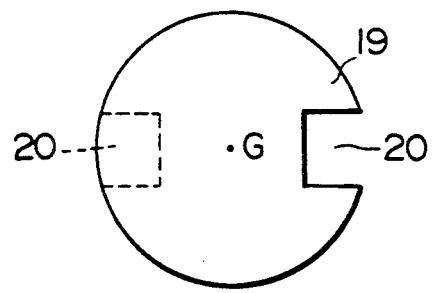
Figure 20:
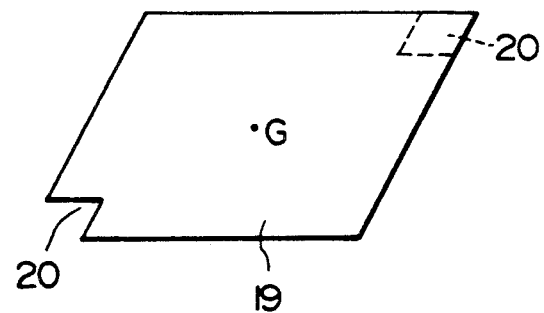

FIGS. 18 through 20 show the variations of supporting plate 19 of the above example. Supporting plate 15 (shown in FIG. 18) is combined with film piezoelectric element 14 of a disc-shape (shown in FIG. 1), and supporting plate 15 (shown in FIG. 20) is combined with film piezoelectric element 14 (shown in FIG. 3). Notch 20, indicated by broken lines in FIGS. 18 through 20, is the notch on the other supporting plate 19 when two supporting plates 19 and 19 are arranged on both sides of film piezoelectric element 14. It is visible that notch 20 lies upon the other notch when the other supporting plate 19 is rotated 180 degrees with the sensing axis G as the rotating axis.

Such a sensing part 18 as described above has a thickness of several millimeters, and forms a rigid element which makes handling easy, and allows a lead wire or terminal to be installed on the film piezoelectric element, utilizing notch 20 on supporting plate 19. In addition, because notches 20 are arranged symmetrically on supporting plates 19, the symmetrical characteristic of sensing part 18 as a whole is not appreciably impaired, and the transverse sensitivity is not aggravated.

Embodiment 5

A 5 mm thick aluminum plate was used as a pedestal on which a sensing part was bonded using an epoxy adhesive. The sensing part uses a glass epoxy plate (supporting plate) of a regular square with the sides of 1 cm in length each, having a thickness of 1 mm and heat conductivity of 0.2 Wm$^{-1}$ K$^{-1}$ bonded on both sides of a polyfluorovinylidene film (disposed with an aluminum deposited electrode) of a regular square with sides of 1 cm in length each, having a thickness of 100 microns as a film piezoelectric element. On this sensing part is bonded a loading element made of brass having a bottom face of a regular square of 1 cm × 1 cm and a weight of 10 g, to form a sensor.

The coefficient of elasticity of the polyfluorovinylidene film is $2.7 \times 10^9$ pa, the composite equivalent coefficient of elasticity of the adhesive layers and the glass epoxy plate (supporting plate) is $1.6 \times 10^9$ Pa, and the thickness of the adhesive layers is about 14 microns.

Comparison 5

A sensor was fabricated in a manner similar to Embodiment 5, except that an aluminum plate (of a 1 cm by 1 cm square with thickness of 1 mm) was used as the supporting plate of the sensing part.

Comparison 6

A sensor was fabricated in a manner similar to Embodiment 5, except that an epoxy resin filled with copper powder formed in a plate (with thickness of 1 mm and heat conductivity of 1 Wm$^{-1}$ K$^{-1}$) was used as the supporting plate of the sensing part.

These three kinds of sensors were tested for their temperature characteristics. The test consisted of blowing heated air on the sensors to rapidly vary the temperatures in the vicinity of the sensors. Evaluation was then made regarding the output variation per unit temperature (1° C.). The output is expressed as a ratio to 1 G output of the sensor. The results are shown in Table 2.

TABLE 2

| | Output variation because of temperature variation (G/°C.) |
|---|---|
| Embodiment 5 | 0.1 |
| Comparison 5 | 1.3 |
| Comparison 6 | 0.7 |

Figure 21:
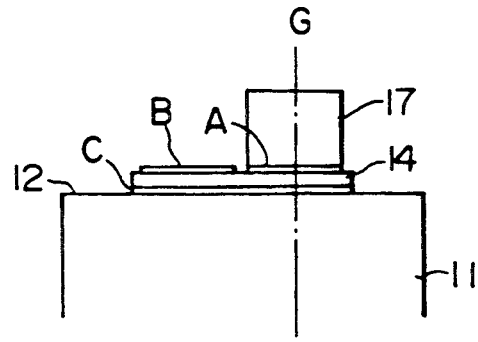
FIGS. 21 and 22 show the third embodiment of the present invention.
Figure 22:
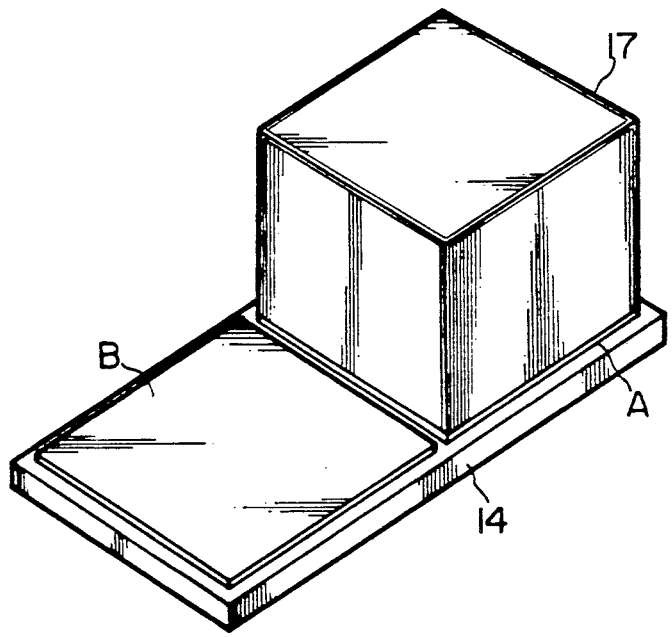

FIGS. 21 and 22 show the third embodiment. In this sensor, film piezoelectric element 14 is fixed on the measuring plane 12 of pedestal 11 through a bonded layer. On the upper surface of this film piezoelectric element 14, are attached square-shaped electrodes A and B, made of aluminum foil, to take out electrical outputs. These have an area of about half that of film piezoelectric element 14. On the rear surface of film piezoelectric element 14 is fixed an electrode C that covers the entirety of the rear surface. The said electrodes A and B are attached with a clearance between them of several millimeters (preferably less than 3 mm, and as small as possible) on the upper surface of film piezoelectric element 14.

In addition, on electrode A on the surface side of film piezoelectric element 14, loading element 17 (made of a rigid material and functioning a an inertial mass) is integrally bonded, covering the upper surface of electrode A through the adhesive layer.

Figure 23:
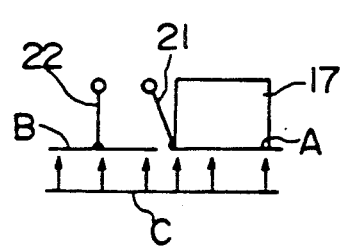
FIGS. 23 and 30 are wiring diagrams of the divided electrodes of the sensor shown in FIG. 21.

FIGS. 23 and 24 show an example of wiring structure to obtain electrical outputs from each electrode in the sensor of the above-mentioned construction. In the wiring structure of this example, when electrode A on the film piezoelectric element 14 and electrode B on the film piezoelectric element 14 are respectively applied with an identical temperature variation and an identical distortion, electrode A and B generate an identical voltage and electric charge respectively. Therefore, the wiring is so arranged that these voltages and electric charges are canceled out.

In other words, as the polarizing direction of the film piezoelectric element 14 is disposed upward in this example, as shown in FIG. 23, a lead wire 21 can be connected to electrode A of the film piezoelectric element 14 and a lead wire 22 to the electrode B in order to take out the voltage or the electric charge.

The shape of the electrodes formed on both sides of film piezoelectric element 14 is not limited to the above-mentioned example. For example, as shown in FIG. 25, the film piezoelectric element may be formed in a regular square, while electrodes A and B may be formed in oblongs of different sizes. Furthermore, if the film piezoelectric element 14 is formed in a regular square, as shown in FIG. 26, electrode B may be formed in a ring along the circumference of film piezoelectric element 14, and electrode A may be formed inside the ring. If the film piezoelectric element 14 is formed in a circle, as shown in FIG. 27, electrode B may be formed in a ring along the circumference of film piezoelectric element 14, and electrode A may be formed inside the ring.

It is also possible to divide into a plurality the electrode on the rear surface of film piezoelectric element 14, as shown in FIGS. 28 and 29.

In the example shown in FIG. 28, the upper surface of the oblong film piezoelectric element 14 is divided into two electrodes A and B, while the electrode on the rear surface is divided into two square electrodes A' and B'.

In the example shown in FIG. 29, the upper surface of the circular film piezoelectric element 14 is divided identically, as in the example shown in FIG. 27, while the electrode on the rear surface is divided into electrode A' of an approximately circular form and electrode B' of a ring form.

In the structure shown in FIGS. 25 through 29, the loading element 17 is bonded o either electrode A or electrode B.

As described above, the shapes of the film piezoelectric element and the electrodes, as well as their wiring structures, can be formed in many ways, as shown in FIGS. 24 through 29. However, there are certain restricting relationships between the wiring structure and the area of the electrodes.

That is, when removing the output as a voltage, there is no special restriction on the electrode area if the wiring has a serial connection structure, as shown in FIGS. 24 through 27, but in the case of a parallel connection structure, as shown in FIGS. 28 and 29, it is preferable to make the areas of electrode A and electrode B, and of the electrode A' and electrode B', all equal.

When removing the output as an electric charge, it is preferable to make each area of electrode A and B equal for a serial connection as shown in FIGS. 24 through 27, and, in the parallel connection, the areas of electrodes A, B, A' and B' are all equal, as in FIGS. 28 and 29.

The above explanation referred to an example of the electrode of film piezoelectric element 14 divided in two, but it goes without saying that the electrodes of film piezoelectric element 14 can be divided into three or more. In this case, the loading element 17 may be bonded on each of the divided electrodes, or on just one of the divided electrodes.

With respect to the symmetry of the plane shape of film piezoelectric element 14 and the symmetry of the three dimensional shape of the loading element 17, the condition described in the first embodiment will apply.

According to the embodiment described above, the separated electric terminals were attached to the upper side of the piezoelectric membrane. However, the terminals can also be attached to the lower side of the piezoelectric membrane. In the latter case, a weight having a cross section substantially identical to that of the electric terminal is attached to the upper side of the piezoelectric membrane so that the membrane is sandwiched by the weight and one of the electric terminals. The electric terminals can be attached to the piezoelectric membrane by virtue of a dielectric adhesive. Supporting plates may be attached to the electric terminals. In this case, the weight is attached to one of the electric terminals. In any variations mentioned above, electric terminals are connected to each other before or after the impedence conversion.

Next, an explanation is given for the operation of the sensor.

The sensor structured according to FIGS. 21 through 24 is used on pedestal 11 mounted with a material to be measured When acceleration is applied to its sensing axis G, the loading element 17 loads according to the acceleration of film piezoelectric element 14, generating a potential difference and an electric charge difference between electrode A on the upper surface of film piezoelectric element 14 and electrode C on the rear surface of the film piezoelectric element 14 based on the distortion generated according to the above load. In this case, electrode A, having the loading element 17 on it, obtains the potential difference and the electric charge difference, but electrode B, having no loading element on it, generates no potential difference and no electric charge difference between itself and electrode C even if an acceleration is given. Therefore, measuring the potential difference and the electric charge difference across the lead wires 21 and 22 identifies the size of the acceleration.

However, although no acceleration is given, if an abrupt temperature change is made in the installed environment of the sensor, the pyroelectric effect generates a potential difference and an electric charge difference between the electrodes A and C, as well as between the electrodes B and C.

The potential difference and the electric charge difference between electrodes A and C and electrodes B and C at this time generates an identical electric charge difference as well as a potential difference relative to an identical temperature variation and an identical stress displacement, and these canceling each other out makes the difference in the voltage output and in the electric charge output zero.

Because the output across electrodes A and C and electrodes B and C is used as a sensor output, even if common mode noise outputs are generated because of the deformation of pedestal 11, these noise outputs are also set off, reducing the noise output value.

The sensor structured according to FIGS. 24 through 27 enables the removal of the output only from electrodes A and B on the upper surface of film piezoelectric element 14, thus making the terminal formation and the manufacture of the sensor easier than in the case where output terminals are formed on the upper and lower surfaces of the film piezoelectric element 14.

Embodiment 6

Several pieces of pedestal using an aluminum plate 5 mm thick were prepared, and on their upper surface PVDF piezoelectric films 100 microns thick were bonded using an epoxy adhesive. As electrodes were used on both sides of the PVDF piezoelectric films, the electrodes cut with the same pattern shown in front and back in FIGS. 24(a) and 24(b). In addition, a sensor was constructed using a brass loading element weighing 10 grams bonded on the electrode using an epoxy adhesive, and was used in the test detailed later. The sensor electrode area was 1 $cm^2$ for both electrodes A and B.

Embodiment 7

A sensor was constructed using nearly the same structure as the sensor used in Embodiment 6, with only the electrode shape and the film piezoelectric element shape made in the same pattern as shown in front and back in FIGS. 25(a) and 25(b). The sensor of this structure has an area of 1 $cm^2$ for electrode A, and 0.5 $cm^2$ for electrode B.

Embodiment 8

A sensor was constructed using nearly the same structure as the sensor used in Embodiment 6, with only the electrode shape and the film piezoelectric element shape made in the same pattern as shown in front and back in FIGS. 26(a) and 26(b). The sensor of this structure has an area of 1 $cm^2$ for both electrodes A and B.

Embodiment 9

A sensor was constructed using nearly the same structure as the sensor used in Embodiment 6, with only the electrode shape and the film piezoelectric element shape made in the same pattern as shown in front and back in FIGS. 27(a) and 27(b). The sensor of this structure has an area of 1 $cm^2$ for electrode A, and 1.5 $cm^2$ for electrode B.

Embodiment 10

A sensor was constructed using nearly the same structure as the sensor used in Embodiment 1, with only the electrode shape and the film piezoelectric element shape made in the same pattern as shown in front and back in FIGS. 28(a) and 28(b). The sensor of this structure has an area of 1 for both electrode A and B.

Embodiment 11

A sensor was constructed using nearly the same structure as the sensor used in Embodiment 6, with only the electrode shape and the film piezoelectric element shape made in the same pattern as shown in front and back in FIGS. 29(a) and 29(b). The sensor of this structure has an area of 1 $cm^2$ for electrode A, and 1.5 $cm^2$ for electrode B.

Comparison 7

A PVDF piezoelectric film formed with electrodes entirely on both sides was bonded on a pedestal identical to the one used in Embodiment 6. A loading element weighing 10 grams was bonded on the above assembly to form a sensor. The PVDF piezoelectric film has a thickness of 100 microns and an area of 1 $cm^2$.

Comparison 8

Figure 30:
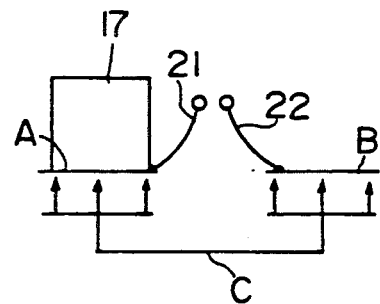

Two PVDF piezoelectric films with an identical area, of which the entire upper and lower surfaces are made into an electrode, were bonded on the pedestal, with one of the films being bonded with a loading element, as shown in FIG. 30, and wired, as a shown in FIG. 30, to form a sensor.

Comparison 9

A sensor was constructed with the same structure as the sensor used in Embodiment 6, making the distance between the electrodes 5 mm.

The following measuring tests were conducted on each of the sensors using the above structures.

(a) Basic Output Measuring Test

The basic sensor output per IG from each electrode through an impedance conversion circuit was measured (mV/G).

(b) Output Measurement Test at Various Temperatures

The acceleration sensor of the above structure assembled into a package was installed 20 cm away from a 60 W incandescent lamp, and the output variation that occurred when it was irradiated with an incandescent lamp light for one second was measured.

The results of the tests are shown in Table 3.

TABLE 3

| | Embodiment | | | | | |
|---|---|---|---|---|---|---|
| | 6 | 7 | 8 | 9 | 10 | 11 |
| Basic output (mV/G) | 13.8 | 14.0 | 13.9 | 13.8 | 7.7 | 8.1 |
| Temperature variation (mV) | 12 | 13 | 7 | 9 | 11 | 10 |

| | Comparison 7 | Comparison 8 | Comparison 9 |
|---|---|---|---|
| Basic output (mV/G) | 13.8 | 13.7 | 13.7 |
| Output variation (mV) | 650 | 250 | 27 |

It was discovered from Table 3 that these sensors can suppress the output variation corresponding to a temperature variation smaller than the acceleration sensors listed in the comparison column.

Next, an explanation is given of the present invention's piezoelectric acceleration senso device.

Figure 31:
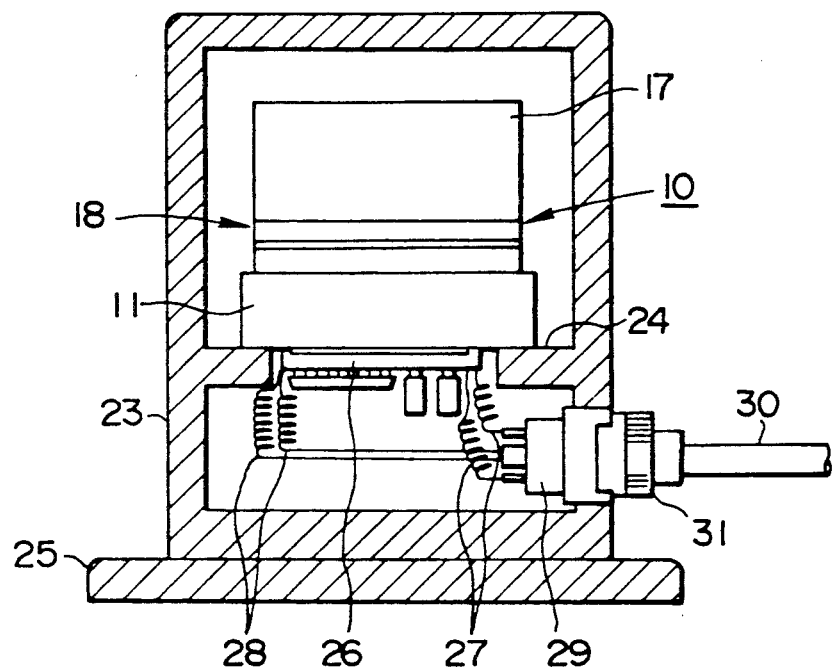
FIGS. 31 and 32 are cross sectional views of examples of the sensor device of the present invention.

FIG. 31 shows an example of the present invention's piezoelectric acceleration sensor device. The numeral 10 indicates a sensor comprising a pedestal (11), a sensing part (18), and a loading element (17). The sensor (10) is contained and fixed in a hollow enclosure (23), to form a piezoelectric acceleration sensor device (hereinafter referred to as the sensor device).

The hollow enclosure 23 consists of a cylinder made of plastics, metal, and ceramics, disposed integrally with a ring-shaped sensor fitting part 24 protruding inside the hollow enclosure 23 at a position slightly below the center of the cylinder length. At the base of the hollow enclosure 23 is an integrally fitting plate part 25, which is fitted to a material to be measured in order to install the sensor device onto this material.

On the sensor fitting part 24 in the hollow enclosure 23, the pedestal 11 of the sensor 10 is raised only at its circumference, as if spanning over the protrusion, with the pedestal 11 being fixed on the sensor fitting part 24 in a suitable manner (including screwing). Thus, the sensor 10 is housed and installed so that it is suspended in the hollow enclosure 23, and a vacant space is formed below the pedestal 11.

Below the pedestal 11 of the sensor 10 is installed a circuit substrate 26 mounted with an impedance conversion circuit and an amplification circuit to process electrical outputs from the sensing part 18. Further, output lead wires 27, which is extended from the circuit substrate 26, and power source wires 28, which supply the operating power to the circuit substrate 26, are connected to the terminals of a connector receptacle 29 fixed on the lower part of the hollow enclosure 23. A plug 31 connected with a connecting cable 30 is inserted into the receptacle 29 to supply power to the sensor device and to output externally signals from the sensor device.

The sensor 10, which comprises the pedestal 11, the sensing part 18, and the loading element 17, is identical with the one explained previously in the embodiment of the piezoelectric acceleration sensor.

Because the sensor device of the above structure disposes the circuit substrate 26 mounted with the impedance conversion and other circuits below the pedestal 11 of the sensor 10, the whole unit is housed in the hollow enclosure 23. Thereby the sensor device will not pick up external noises, and will raise the S/N ratio to make the voltage available as an output. The structures does not require a large base area of the sensor device and allows the device to be compact. In addition, when the sensor device is put to use, the device turns to a measurable condition only by inserting the plug 31 connected with the connecting cable 30 into the receptacle 29, a great convenience for practical operation.

Furthermore, in this sensor device, the whole unit of the sensor 10 is fixed in a suspended condition as the pedestal 11 is fixed only at its circumference, and a vacant space is formed below the pedestal 11.

Therefore, the structure reduces greatly the incoming and outgoing heat associated with temperature variations external to the hollow enclosure 23, minimizing the heat transmitted to the film piezoelectric element 14 in the sensing part 18 of the sensor 10, largely reducing the generation of a temperature distribution in the film piezoelectric element 14, and resulting in very little output caused from a pyroelectric effect. Therefore, the sensor device has very little output caused from external temperature variations, thereby improving its measuring characteristics. The shape of the pedestal and the hollow enclosure is not limited cylindrical and circular.

Embodiment 12

A ceramic disc with t thickness of 1 mm and a diameter of 9 mm was used as a pedestal. A film piezoelectric element made of polyvinylidene fluoride (with aluminum deposited electrode), having a thickness of 100 microns and a diameter of 6 mm was placed between two glass epoxy plates (supporting plates), each having a thickness of 1 mm and a diameter of 6 mm, and bonded together using epoxy adhesive to form a sensing part. This sensing part was bonded to one of the surfaces of the pedestal. A brass loading element with a volume 6 mm in diameter (weighing 10 grams) was bonded on the sensing part using an epoxy adhesive to form a sensor. This sensor was housed and fixed in a hollow enclosure made of cast aluminum in a suspended condition as shown in FIG. 31. A circuit substrate mounted with an impedance conversion circuit was installed below the sensor to form the sensor device of the present invention.

Comparison 10

The sensor device of Embodiment 12, of which the clearance below the sensor pedestal was filled with epoxy resin.

Comparison 11

A ceramic substrate 1 mm thick, 1 cm wide and 1.5 cm long was used as a pedestal. The sensing part and the loading element used in Embodiment 12 were laminated on the pedestal, and the same circuit substrate was arranged on the substrate on the side of this laminate of the sensing part and loading element. The whole assembly was housed and fixed in a cast aluminum enclosure of a shallow box shape to form a sensor device. The ceramic substrate used as the pedestal serves as one side of the enclosure; the rear side of the substrate is exposed to the outside.

The three kinds of sensor devices constructed according to Embodiment 12 and Comparisons 10 and 11 were installed on an aluminum plate 10 mm thick. Air heated to 80° C. was blown from a distance of 10 cm from the direction of the sensor pedestal for ten seconds to measure the output caused by the pyroelectric effect.

The pyroelectric output (maximum value) was 100 mV for the sensor device of Embodiment 12,300 mV for the device of Comparison 10, and 350 mV for the device of Comparison 11. It is understood that the sensor device of Embodiment 12 has the least output caused by the pyroelectric effect. In addition, the sensor device of Embodiment 12 is more compact and can be made lighter due to the presence of a vacant space.

Figure 32:
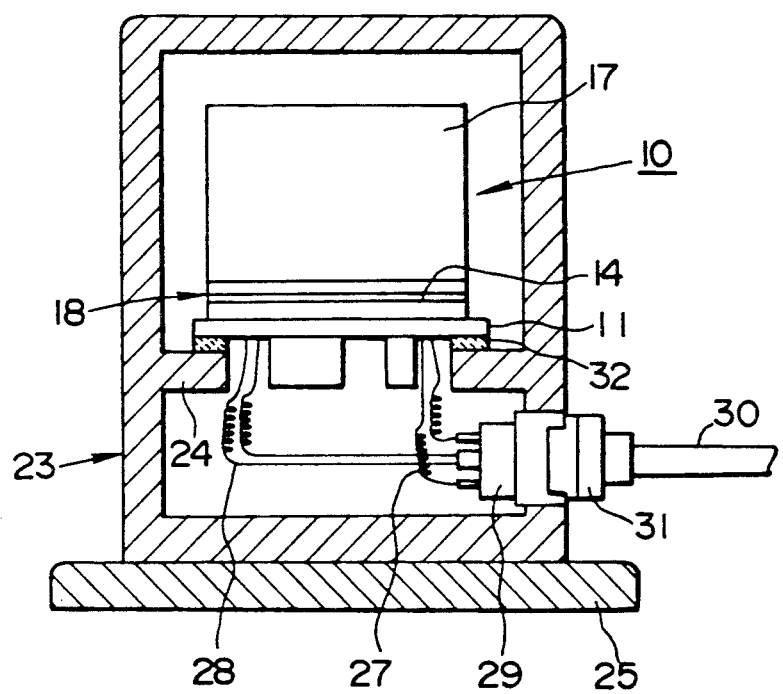

FIG. 32 is a variation of the above-mentioned sensor device. This device has a buffer layer 32 interposed between the sensor fitting part 24 in the enclosure 23 and the pedestal of the sensor 10 in order to relieve heat stress.

The buffer layer 32 has a ring shape, and must have lower coefficient of elasticity than the hollow enclosure 23 and the pedestal 11. For example, a glass epoxy laminate that has a higher coefficient of elasticity in its longitudinal direction than in this lateral direction is a preferable choice. The most favorable choice is a buffer layer 32 that (a) has coefficient of elasticity in the fixing direction of the buffer layer 32 in the hollow enclosure 23 (b) is smaller than that of the pedestal 11 and the hollow enclosure 23, and (c) satisfies the following equation:

$$\frac{|\alpha - \beta|}{t} \leq 1 \times 10^{-4} \,(^\circ C.^{-1} \cdot t^{-1}),$$

where $\alpha$ is a linear expansion factor of the pedestal 11, $\beta$ is a linear expansion factor of the hollow enclosure 23, and t is the thickness of the buffer layer 32.

The above equation represents the ability of the buffer the linear expansion coefficients of the hollow enclosure 23 and the pedestal 11.

An explanation is given of specific examples of sensor devices fitted with the buffer layer 32. (Embodiments 13, 14 and Comparisons 12, 13 and 14)

A PVDF piezoelectric film 100 microns thick was placed between two 1.0 mm thick glass epoxy plates, bonded together, and cut to a 5 mm square. A loading element made of a brass block and having the same base area (weighing 10 g) was bonded to the 5 mm square. The assembly was bonded to an alumina pedestal 9 mm in diameter and 0.7 mm thick, and then fitted to a composite enclosure of brass and polyamide resin (through buffer layers of various materials) in order to form sensor devices.

The atmospheric temperature surrounding these sensor devices was modulated from $-20°$ C. to $70°$ C. to identify their characteristics relative to their outputs at normal temperatures. The results are shown in Table 4.

TABLE 4

| | Enclosure Coefficient of Elasticity (Pa) | Circuit Substrate Coefficient of Elasticity (Pa) | Buffer Layer | | | $\frac{|\alpha - \beta|}{t}$ | Temperature Characteristics (%) |
|---|---|---|---|---|---|---|---|
| | | | Material | Coefficient of Elasticity (Pa) | Thickness (mm) | | |
| Embodiment | | | | | | | |
| 13 | $6.4 \times 10^9$ | $3.8 \times 10^{11}$ | Glass Epoxy Ring | $6 \times 10^9$ | 1 | $7.2 \times 10^{-5}$ | ±10 |
| 14 | " | " | Glass Epoxy Ring | " | 1.5 | $4.8 \times 10^{-5}$ | ±8.5 |
| Comparison | | | | | | | |
| 12 | " | " | Glass Epoxy Ring | " | 0.5 | $14.4 \times 10^{-5}$ | ±22 |
| 13 | " | " | Aluminum | $6.8 \times 10^{10}$ | 1 | $7.2 \times 10^{-5}$ | ±15 |
| 14 | " | " | Iron | $2 \times 10^{11}$ | 1 | $7.2 \times 10^{-5}$ | ±18 |

For the sensor device of Table 4, the pedestal and the enclosure may be of other shapes so long as they are supported at the periphery.

As another variation of the sensor device, the sensor and the enclosure can be bonded with an adhesive having a tensile coefficient of elasticity of $10^7$ Pa to $10^9$ Pa in place of the above buffer layer. If the above adhesive has a tensile coefficient of elasticity of more than $10^7$ Pa, the resilient adhesive acts as a buffer layer to relieve heat stress, decreasing the ability to reduce output variation associated with ambient temperature variation. If the adhesive has a tensile coefficient of elasticity of less than $10^5$ Pa, the coefficient of elasticity becomes too low, reducing the bonding strength. Epoxy/rubber adhesives are available for such a purpose, and EP-001 (a product name) made by Cemedine is an especially suitable adhesive.

Glass transfer temperatures should not be within the sensor device operating temperature range. The above adhesive is therefore preferable as the adhesive has the above coefficient of elasticity at normal temperatures and a much lower glass transfer temperature than conventional epoxy adhesives. (Conventional epoxy adhesives have a glass transfer temperature of 50° C. to 60° C., while the above EP-001 has one of −60° C.)

In the sensor device of this structure, the adhesive acts as a buffer layer to relieve heat stress at the interface between the hollow enclosure 23 and the pedestal 11, making it possible to reduce output variation caused from ambient temperature variation. The use of this adhesive can also improve impact resistance at the interface between the pedestal 11 and the hollow enclosure 23. Furthermore, because the adhesive's glass transfer temperature (Tg) is outside the range of the sensor device's operation temperatures, the performance fluctuation of the sensor device at around the Tg will not appear during normal operating conditions, and thereby the output variation can be further reduced.

Embodiments 15 and 16 and Comparisons 15, 16 and 17

A PVDF piezoelectric film 110 microns thick was placed between two glass epoxy plates 1.0 mm thick, bonded together, and cut to a 5 mm square to form a sensor chip (sensing part), on which a loading element made of a brass block, having the same base area was bonded in order to form an acceleration sensor (weighing 1 gram). This sensor was bonded to an alumina pedestal (9 mm in diameter and 0.7 mm thick) to form a sensor unit.

This sensor unit was fitted to a hollow enclosure made from a brass-fabric-nylon composite. To form sensor devices, the pedestal was bonded to the hollow enclosure using various kinds of adhesives with the coefficient of elasticity shown in Table 5. Each acceleration sensor using various kinds of adhesives was installed on an aluminum block vibration table and given an acceleration of 80 Hz, 1G. The ambient temperature surrounding the sensors was modulated from $-20°$ C. to $+70°$ C. to measure output variation and temperature characteristics.

Among the sensors shown in Table 5, twenty devices each from Embodiment 15 and Comparison 17 were droped from a height of 1 m onto a concrete block to measure how may samples were more than 50% destroyed. For Embodiment 15, the table indicates that this number was "1". Adhesives used in Embodiment 15 and Comparison 17 had nearly the same bonding strength.

TABLE 5

|  | Embodiment | | Comparison | | |
| --- | --- | --- | --- | --- | --- |
|  | 15 | 16 | 15 | 16 | 17 |
| Adhesive Resilience (Pa; 20° C.) | $1 \times 10^7$ | $5 \times 10^6$ | $2 \times 10^7$ | $5 \times 10^7$ | $1 \times 10^9$ |
| Temperature Characteristics | ±10% | ±7% | ±25% | ±33% | ±42% |
| Impact resistance | 1 | — | — | — | 0.4 |

As can be read from the above take, it was discovered that while the devices in Embodiments 15 and 16 can suppress output variation to within ±10%, the other devices have a very large variation. The impact resistance was verified to have largely improved in the devices of Embodiments 15 and 16.

What is claimed is:

1. A piezoelectric acceleration sensor for measuring acceleration of an object along a predetermined axis of measurement, the sensor being suitable for being attached to the object, the sensor comprising:
   (a) a base member to be attached to the object;
   (b) measurement unit supported by the base member, extending in a plane perpendicular to the predetermined axis of measurement, and symmetric with respect to a point, the measurement unit comprising:
      (i) a piezoelectric membrane;
      (ii) a pair of metallic terminal plates attached to both surfaces of the piezoelectric membrane, wherein at least one of the metallic terminal plates is secured to the piezoelectric membrane by a dielectric adhesive; and
      (iii) a pair of support members attached to the opposite surfaces of said metallic terminal plates, wherein the support members have a thermal condition coefficient less than 0.5 $Wm^{-1}K^{-1}$, in order to prevent thermal noise; and
   (c) a weight means attached to a surface of the measurement unit, the weight means having cross-sections, in any plane perpendicular to the predetermined axis, symmetric with respect to a point whereat the axis crosses the cross-section.

2. A piezoelectric acceleration sensor according to claim 1 wherein the base member and the weight means are attached to the measurement unit by means of an adhesive, and the following equation is satisfied regarding a thickness of he dielectric adhesive layer ta, Young's modulus of the dielectric adhesive layer Ea, thickness of the piezoelectric membrane tp, and the Young's modulus of the piezoelectric membrane.

3. A piezoelectric acceleration sensor according to claim 1 wherein the weight means comprises a plurality of weight layers piled one on top of the other.

4. A piezoelectric acceleration sensor according to claim 1 wherein the piezoelectric layer comprises a plurality of piezoelectric films laid one on top of the other.

5. A piezoelectric acceleration sensor for measuring acceleration of an object along a predetermined axis of measurement, the sensor being suitable for being attached to the object, the sensor comprising:
   (a) a base member to be attached to the object;
   (b) measurement unit supported by the base member, extending in a plane perpendicular to the predetermined axis of measurement, the measurement unit comprising a piezoelectric membrane, and a pair of electric terminal plates attached to both surfaces of the piezoelectric membrane, wherein at least one of said electric terminal plates is composed of a plurality of sections separated from one another; and
   (c) weight means attached to at least one of said sections, the weight means having cross-sections, in any plane perpendicular to the predetermined axis, symmetric with respect to a point whereat the axis crosses the cross-section; and
   wherein said section attached with the weight means are electrically connected with said section to which no weight means are attached, and wherein each of said sections connected with one another is disposed on a reverse side of said piezoelectric membrane, and wherein the remaining section on the same side as said section attached with the weight means is electrically connected with the remaining section on the same side as said section to which no weight means are attached.

6. A piezoelectric acceleration sensor according to claim 1 or 5, further comprising:
   (d) an electric circuit disposed on a side of the base member opposite to the measurement unit; and
   (e) an enclosure for retaining the base member, the measuring unit and the weight means therein, wherein a limited portion of the base member is attached to the enclosure so that a substantial portion of the base member is not in contact with the enclosure.

7. A piezoelectric acceleration sensor according to claim 6 wherein the base member is attached to the enclosure via a thermal insulating means for reducing thermal stress.

8. A piezoelectric acceleration sensor according to claim 7 wherein the thermal insulating means is an adhesive having a Young's modulus between $10^5$ and $10^7$ Pa inclusively.

* * * * *